United States Patent [19]

Mankovitz et al.

[11] Patent Number: 5,523,794
[45] Date of Patent: Jun. 4, 1996

[54] METHOD AND APPARATUS FOR PORTABLE STORAGE AND USE OF DATA TRANSMITTED BY TELEVISION SIGNAL

[76] Inventors: Roy J. Mankovitz, 18057 Medley Dr., Encino, Calif. 91316; Henry C. Yuen, P.O. Box 1159, Redondo Beach, Calif. 90278

[21] Appl. No.: 48,761

[22] Filed: Apr. 16, 1993

[51] Int. Cl.$^6$ ............................................. H04N 7/087
[52] U.S. Cl. ................................. 348/460; 348/478
[58] Field of Search ............................ 235/380, 381, 235/383; 348/1, 3, 12, 13, 460, 461, 473, 478; 455/4.2, 5.1, 2; 358/84, 85, 147; H04N 7/16, 7/087

[56] References Cited

U.S. PATENT DOCUMENTS

| | | | |
|---|---|---|---|
| 3,095,653 | 7/1963 | Corrigan | 35/9 |
| 3,599,221 | 8/1971 | Baer | 346/1 |
| 3,848,082 | 11/1974 | Summers | 348/460 |
| 4,186,413 | 1/1980 | Mortimer | 358/146 |
| 4,405,829 | 9/1983 | Rivest et al. | 178/22.1 |
| 4,825,467 | 4/1989 | Rist et al. | 380/7 |
| 4,903,297 | 2/1990 | Rist et al. | 380/7 |
| 4,910,775 | 3/1990 | Yves et al. | 380/25 |
| 4,999,617 | 3/1991 | Uemura et al. | 340/706 |
| 5,034,807 | 7/1991 | Von Kohorn | 358/84 |
| 5,057,915 | 10/1991 | Von Kohorn | 455/2 |
| 5,070,404 | 12/1991 | Bullock et al. | 348/461 |
| 5,073,931 | 12/1991 | Audebert et al. | 380/23 |
| 5,136,644 | 8/1992 | Audebert et al. | 380/25 |
| 5,189,287 | 2/1993 | Parienti | 235/380 |
| 5,192,854 | 3/1993 | Counts | 235/375 |
| 5,249,044 | 9/1993 | Von Kohorn | 455/4.2 |
| 5,276,311 | 1/1994 | Hennige | 235/380 |
| 5,282,249 | 1/1994 | Cohen et al. | 235/380 |
| 5,287,181 | 2/1994 | Holman | 348/473 |
| 5,294,782 | 3/1994 | Kumar | 235/380 |
| 5,297,205 | 3/1994 | Audebert et al. | 380/23 |

FOREIGN PATENT DOCUMENTS

| | | | |
|---|---|---|---|
| 0267085B1 | 5/1988 | European Pat. Off. . | |
| 0266467 | 5/1988 | European Pat. Off. . | |
| 402992 | 12/1990 | European Pat. Off. | H04N 7/087 |
| 257934 | 9/1986 | France . | |
| 117837 | 7/1984 | Japan | H04K 1/00 |
| WO9102328 | 1/1991 | WIPO . | |

Primary Examiner—James J. Groody
Assistant Examiner—Chris Grant
Attorney, Agent, or Firm—Christie, Parker & Hale

[57] ABSTRACT

Decoding of data included in the vertical blanking interval of a television transmission signal and storage of the decoded data on a portable data coupon allows unavailable ease of use of commercial discounts, manufactures coupons, and other cost saving devices. The portable data coupon incorporates a receiver (16) for retransmitted encoded data and a storage device (36) for the received data. A display (22) for viewing the data is present in the storage device and a transmitting device (32) is incorporated for selectively transmitting portions of the encoded data for use such as in redeeming a coupon or discount. Selection of data received in the coupon from the VBI to be saved in storage for later redemption is accomplished through interactive input by the user and automatic timing for expiration of data and deletion of data upon redemption are also provided.

50 Claims, 6 Drawing Sheets

METHOD AND APPARATUS FOR PORTABLE STORAGE AND USE OF DATA TRANSMITTED BY TELEVISION SIGNAL

BACKGROUND OF THE INVENTION

1. Field of the Invention

The present invention relates generally to storage of data provided as a nonprogram portion of television transmission signals. In particular, the invention provides a system for decoding data included in the vertical blanking interval of a television transmission signal and a portable data coupon for storage of selected information from the data received by the system for future use.

2. Prior Art

Television broadcast signals provide significant windows in the signal for insertion of data in addition to the required program signals for video and audio reception. The vertical blanking interval (VBI) of the television transmission signal has been employed in the past for data to provide closed captioning for the hearing impaired.

Decoders for data provided in the VBI are well known in the art and standards are being developed for data formats to usefully employ the VBI for transmission of additional data. Typical uses of VBI data to date have been similar to closed captioning wherein data received in the VBI is decoded and provided as a separate video signal for printing of information to the television screen for viewing by the user. Capability of prior art systems to decode, store and usefully employ data which can be provided in the VBI has been extremely limited.

Exemplary of data which may be provided in the VBI are channel specific program information such as short term upcoming program schedules and program related information such as statistics of baseball players during a baseball game, recipes provided during a cooking lesson, problem assignments and answers after an educational program and other related information displayed on the screen relevant to the program being viewed. The majority of this type of information may be displayed or is desirable to be displayed concurrently with existing video programming. Consequently, systems for decoding and presentation of the desired information rely on essentially identical technology to the closed caption systems previously described.

Significant additional information may be disseminated through the use of VBI signaling, however, practical systems for storage and use of the data to be provided are not presently available. Commercial information such as supplemental telephone number information, identification of local dealers and supplemental product/price information in addition to the video and audio presentation of a common television commercial are desirable. For greatest benefit this information should be available subsequent to the presentation of the video/audio commercial and should be stored for subsequent access and/or use. Merely overwriting the existing video of a commercial with additional information presented in the VBI produces no more favorable result for the advertiser than the materials in the commercial itself. Such information conveyed on video is fleeting and most viewers are not disposed to take any action while actually viewing a commercial. Transmission of data on the VBI which can be captured and displayed subsequently on the screen at the command of the user extends the usefulness of the real time broadcast adding "virtual time" in which potential customers may review important sales related information at their leisure.

As a portion of the concept of providing commercial information, discount information for sales or services may be provided. At the present time discounts are typically provided in the form of coupons distributed to consumers in print form such as newspapers, magazines, store dispensers and so on. The coupon is removed from its source by the consumer and brought to the store for redemption. Most coupons presently employ a UPC code number in the form of a bar code to allow easy confirmation of product, discount value, expiration date and other information for comparison with the goods actually purchased by the consumer to avoid coupon fraud.

The availability of the transmission medium for "coupon" information in the VBI of television transmission signals opens a new channel for both the advertiser and consumer in the field of commercial communications. The present invention provides a method and system whereby such commercial information may be obtained, stored and used conveniently to obtain the greatest benefit from the presentation medium.

SUMMARY OF THE INVENTION

The present invention provides an apparatus for receiving, storing and using commercial or other data provided by transmission during the VBI of a television broadcast signal. A controller which is connected to receive television transmission signals incorporates a VBI decoder for extracting encoded data from the vertical blanking interval of the television transmission signal. A retransmitting device is provided by the controller for sending the VBI data which is received to a portable data coupon. The portable data coupon incorporates a receiver for the retransmitted encoded data and a storage device for the received data. The data coupon includes a display for displaying data present in the storage device which is routed through an internal decoder to provide an alphanumeric read out. The coupon further includes a transmitting device for selectively transmitting portions of the encoded data to a receiving apparatus for use.

A memory included in the controller provides additional flexibility for receiving the encoded data from the VBI decoder and subsequently transmitting the data to the portable data coupon. A multiplexer in the controller determines selection of memory storage or immediate retransmission.

A memory equipped controller also includes a receiver which is employed to receive data transmitted by the portable data coupon for storage in the controller memory. In this embodiment the controller acts as the receiving apparatus for the data transmitted from the portable data coupon.

VBI data may provide differing information to the controller which is applicable to multiple uses. The VBI decoder of the controller incorporates the capability for decoding multiple categories of encoded data. A microprocessor or other programmable logic controller segregates the categories of data and a data formatter connected to the retransmission system formats the data corresponding to its category. Additionally, control signals generated by the controller are formatted for segregation from VBI data. The receiver in the portable data coupon discriminates between the formatted data categories to allow storing of only desired data in the portable data coupon or segregation of the data based on data category.

Clocks or other time keeping means are provided in the portable data coupon and the controller for time marking of data and comparison of time marked data with current time and date. Transmitted data may also incorporate time information which is employed for updating of the clocks in the controller and portable data coupon.

Data stored in the portable data coupon is selectively deleted manually or automatically after transmission from the data coupon for an end use. As exemplified by the use of the portable data coupon for merchandise or service discounts, transmission of the stored data relating to the discount equivalent to the redemption of a paper coupon would result in automatic deletion of that data from the memory of the portable data coupon thereby precluding reuse of the discount.

BRIEF DESCRIPTION OF THE DRAWINGS

The present invention will be more clearly understood with reference to the following drawings and detailed specification.

DETAILED DESCRIPTION

Figure 1:
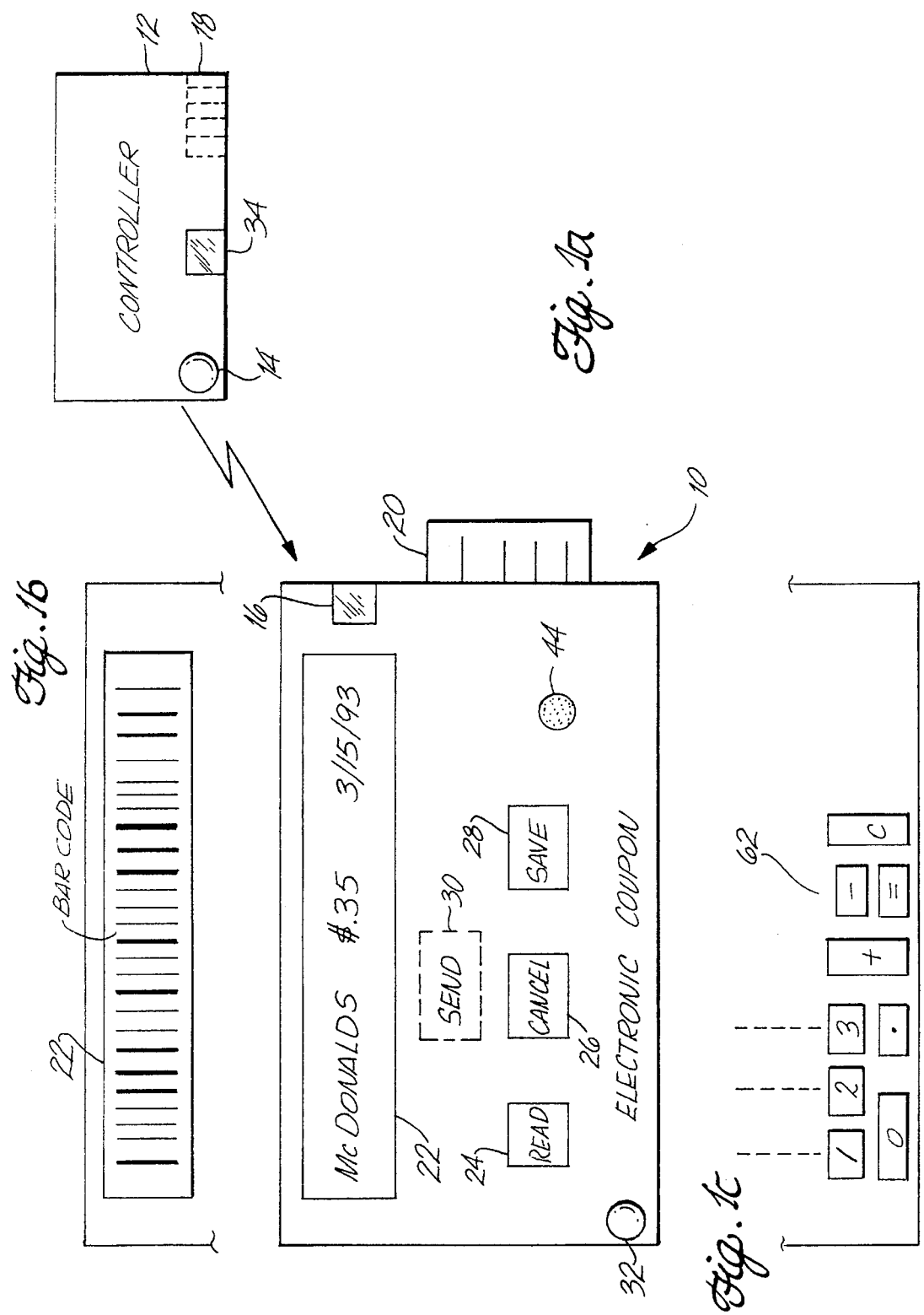
FIG. 1A shows in schematic form the electronic data coupon with display controls and various interface devices in combination with a controller having communications interfaces for the portable data coupon.
FIG. 1B provides a representation of the display of the portable data coupon wherein the display mode shows a UPC bar code format for use with a laser scanner.
FIG. 1C is a partial schematic representation of a second embodiment of the portable data coupon employing a alphanumeric key pad for data input.

Referring to FIG. 1A, a portable data coupon 10 is shown to provide practical secondary use of data transmitted in the vertical blanking interval of television transmission signals. VBI data is decoded from the television transmission signal by controller 12 which then transmits the data to the portable electronic coupon. In the embodiment shown in the drawings, two transmission methods are available. An IR emitter 14 which provides a wide band infrared signal which is received by an IR detector 16 on the portable data coupon allows "remote" communication with the portable data coupon. Alternatively, a serial interface may be employed with a first moiety of a connector 18 in the controller receiving a mating second moiety of the connector 20 present on the portable data coupon. Transmission of the data employing the IR emitter/detector combination allows placement of the portable data coupon at any desired location where the broad band infrared radiation from the emitter can be received. The serial interface requires direct connection of the portable data coupon to the controller unit.

The portable data coupon includes a display 22 on which data received and stored in the portable data coupon may be shown to the user. Controls for operation of the portable data coupon including a "read" key 24 for calling data to the display, a "cancel" key 26 for deleting data, a "save" key 28 for protecting stored data as will be discussed subsequently, and a "send" key 30 for initiating transmission of data stored in the portable data coupon. An IR emitter 32 is provided for transmitting data stored in the portable data coupon to a receiving apparatus responsive to the "send" key. Alternatively, data may be sent to a receiving apparatus using the serial interface previously described for receiving data.

In the embodiment shown in the drawings the controller also includes an IR detector 34 for receiving data transmitted by the portable data coupon in various applications to be described in greater detail subsequently.

Figure 2:
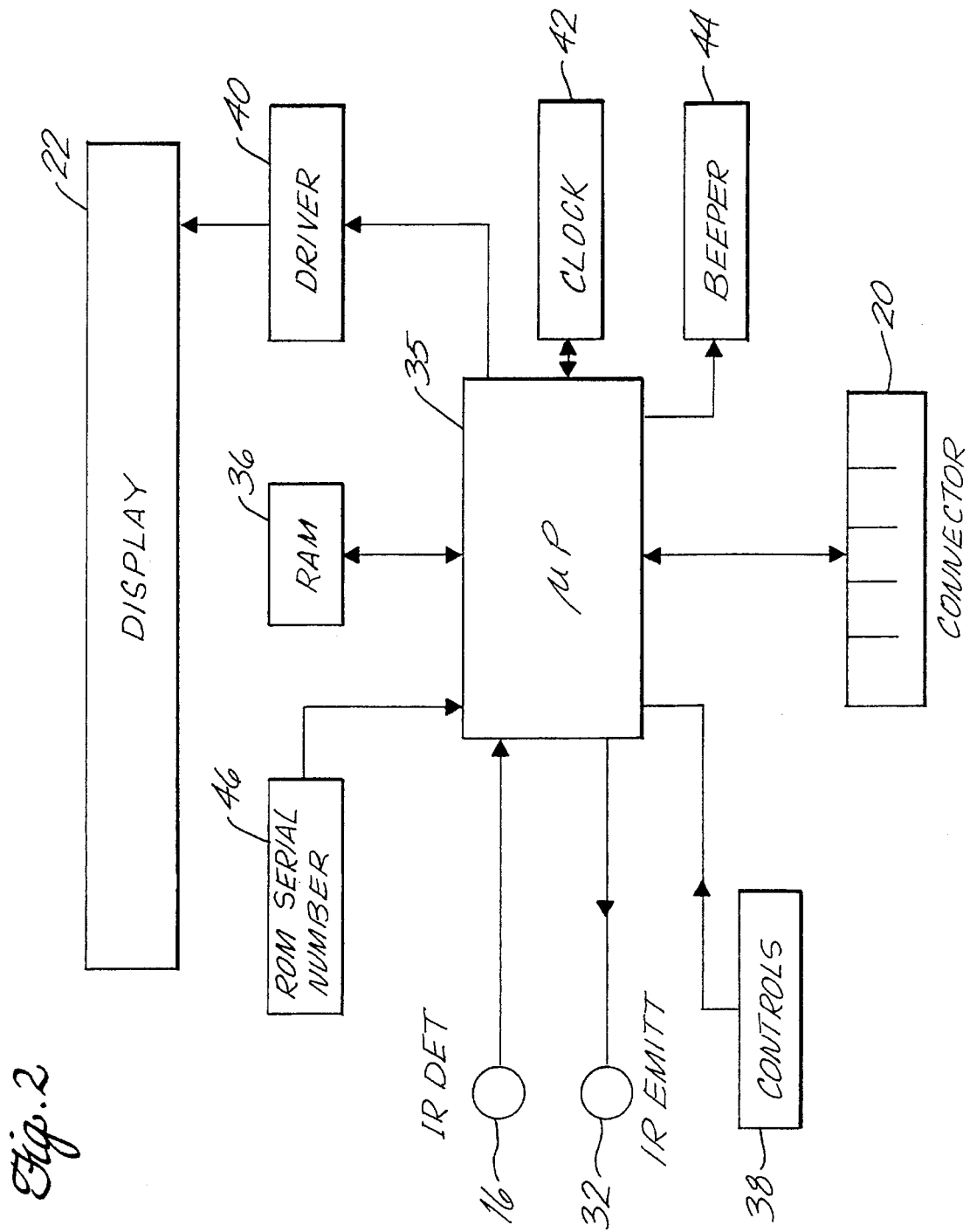
FIG. 2 is a schematic block diagram of the operational elements of the portable data coupon.

The structure of the operating components of the portable data coupon are best seen in FIG. 2. Encoded data transmitted by the controller is received through the IR detector or serial port connector and provided to a microprocessor. The microprocessor stores the data in a storage device such as a random access memory (RAM) 36 for the embodiment shown in the drawings. Data manipulation in the portable data coupon is provided by the microprocessor responsive to the controls previously described which are generally described in FIG. 2 as controls 38. In response to the user depressing the read key, the microprocessor will retrieve the encoded data from a presently addressed memory location in the RAM and decode the data for output through a driver 40 to the display. In the embodiment shown in the drawings a Liquid Crystal Display (LCD) is provided with multiple alphanumeric character capability.

Depressing the cancel key on the portable data coupon causes the microprocessor to delete the data in the memory location corresponding to the data on the display while depressing the send key will result in transmission of the data in the memory location corresponding to the displayed data through the IR emitter or serial port connector.

In the embodiment shown in the drawings data received by the portable data coupon is placed in a temporary storage buffer of the RAM. This temporary storage comprises a predetermined number of storage locations addressed by the microprocessor. When the temporary storage buffer is full additional data received by the portable data coupon will be written into the temporary buffer by the microprocessor over writing the oldest data in the buffer. A circular address pointer system for first in, first out storage in the temporary buffer or similar addressing technique is employed by the microprocessor. Data which the user desires to retain is written from the temporary storage buffer to a protected buffer by depressing the save key on the coupon. In response to the save key the microprocessor will protect the data in the temporary storage buffer corresponding to the data on the display by transferring the data to a protected or permanent storage buffer in the RAM or alternatively setting a protect flag on the storage location to prevent over-writing of the data.

The portable data coupon incorporates a clock 42 for timekeeping purposes to provide current time and date and for time flagging of received data by the microprocessor during storage. Encoded data received by the portable data coupon can include time information (station time data) decoded by the microprocessor for updating the internal clock.

The microprocessor incorporates within the data handling capability a sorting function for the data received to allow data of different formats to be employed by the portable data coupon. Transmitted timekeeping data and data received by the clock are exemplary of these data categories. Additional categories for various applications of the portable data coupon will be described in greater detail subsequently.

For certain applications data received by the portable data coupon will incorporate "prompt" information to identify to the user the desirability of transferring received data from the temporary storage buffer to protected storage. A flashing character presentation on the display or an audible signal provided by a beeper 44 under the control of the microprocessor are employed as the user prompt. The user prompt provides an additional category of data received by the portable data coupon.

Data stored in the portable data coupon is transferable to a receiving apparatus through the IR emitter or the serial port connector. The portable data coupon may therefore act as a data transfer device in addition to a data storage device. Confirmation of the portable data coupon as the source for data transmitted to such receiving apparatus is accomplished by a specific serial number or other code for the portable data coupon stored in a read only memory (ROM) 46 accessible by the microprocessor for transmission with the data to the receiving apparatus. A receiving apparatus including a data transmission system through an IR emitter or alternatively in a serial port connection can employ a dialog approach with the microprocessor of the portable data coupon for review of data contained within the portable data coupon, extraction of appropriate data and confirmation of the identification of the portable data coupon.

An example of the operation of the portable data coupon in a primary anticipated use provides supplemental data storage and "electronic coupons" for discounts on merchandise or services offered in television commercials. During the vertical blanking intervals of a television commercial, information associated with the telephone number, address or selection information for local dealers of the product or service are transmitted or details of offered discounts including identification of merchandise, value of the discount, expiration date and so on. The controller decodes the VBI data using standard techniques. The data present in the VBI is further encrypted to avoid use by systems other than authorized portable data coupons. The encoded data stripped from the VBI is retransmitted to the portable data coupon where it is stored in temporary memory as previously described. The coupon user may then retrieve the information from the memory through the use of the read key. Telephone numbers, addresses and similar information are decoded by the microprocessor and displayed on the portable data coupon for review by the user through the use of the read key. Electronic coupon information is displayed in one of several formats. An alphanumeric format showing the vendor/producer/dealer, amount of discount and expiration date allows the user to determine the value of the "electronic coupon." A standard UPC bar code format is alternatively presented on the display through predetermined key strokes on the existing keys or by way of a "shift" key (not shown) for use with redemption systems employing a laser scanner or similar system. The UPC bar code system allows easy comparison by automatic cash register systems of goods purchased. Such a bar code display is shown in FIG. 1B.

At a predetermined time after completion of the television commercial to allow the user to contemplate the information provided, a prompt command is provided in the VBI data which is retransmitted by the controller to the television screen or to the portable data coupon. Upon receiving the prompt command the microprocessor activates the beeper or flashing display character to call the user's attention to the fact that a coupon or other information has been provided. The user may review the information using the read key and determine if the information should be saved in protected storage to preclude over-writing by subsequent commercial information. If the save key is pressed, the information is protected and may then be used subsequently for redeeming the "electronic coupon." Alternatively, if the information is of no interest to the user, the cancel key may be pressed and the data cancelled at that time.

The portable data coupon monitors expiration date information provided in the encoded data and the microprocessor compares current time and date information provided by the internal clock to the expiration date of information present in data storage. Upon reaching a predetermined period prior to an expiration date the microprocessor will display the information corresponding to the approaching expiration date and prompt the user by activating the beeper or flashing display cue. Data in protected and temporary storage which contains an expiration date is monitored by the microprocessor and upon passing the expiration date the memory locations are cleared thereby conserving memory resources.

Figure 3:
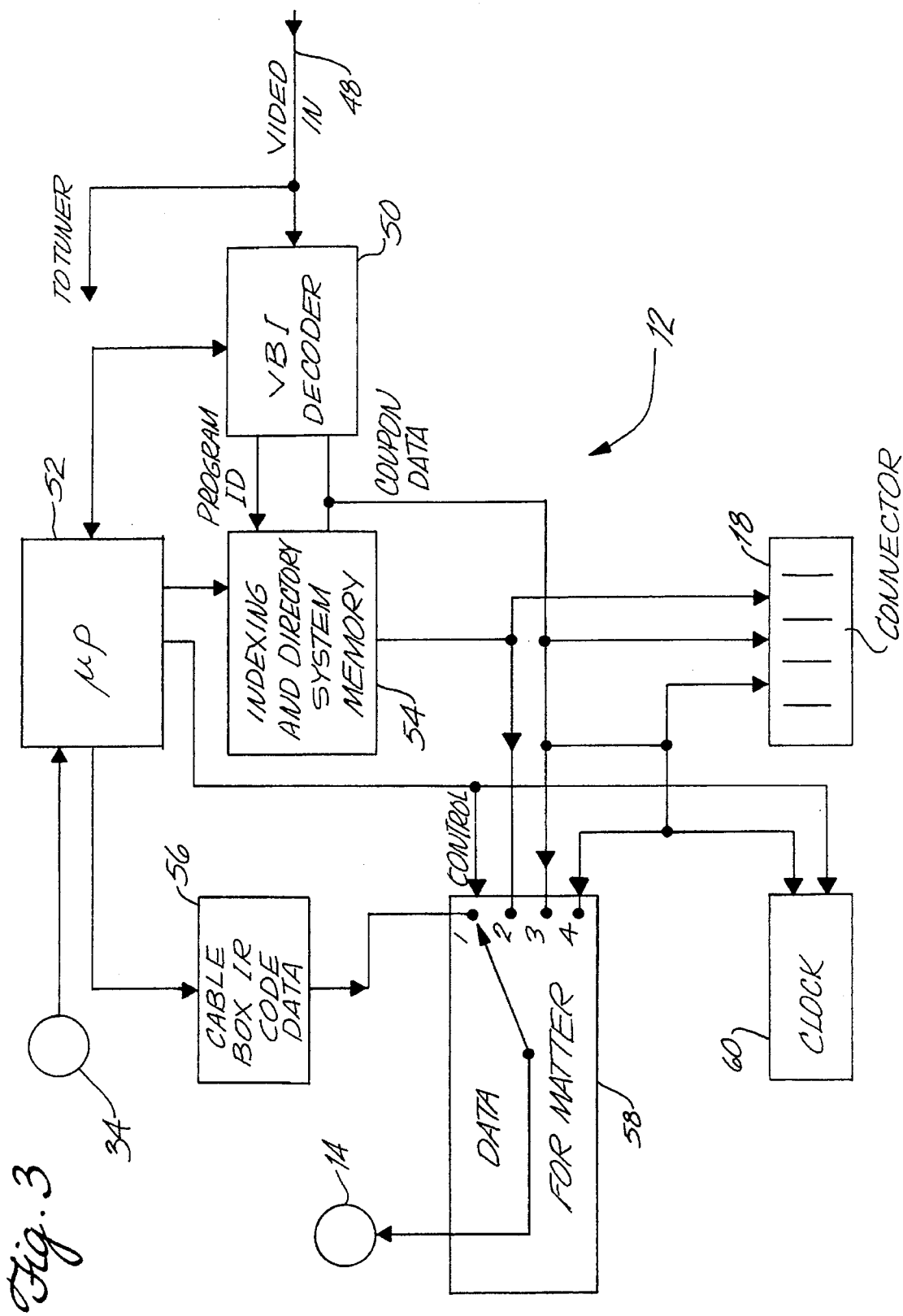
FIG. 3 is a schematic block diagram of the controller for the vertical blanking interval data application system.

An embodiment of the controller for use with the portable data coupon is shown in FIG. 3. The controller may be incorporated in the television itself or other product incorporating a VBI decoder and data retransmission system as previously described. Incorporation of the controller into a VCR system is accomplished in a present embodiment employing a system as disclosed in U.S. patent application, Ser. No. 08/014,541 filed on Feb. 8, 1993, entitled "Enhancing Operations of Video Tape Cassette Players" having a common assignee as the present invention which is incorporated herein in its entirety by reference.

As shown in FIG. 3, the controller receives the television broadcast signal on the video input line 48, video is also provided to the tuner of the television set (not shown) for normal television viewing. A VBI decoder 50 receives the video input signal and decodes the data provided in the vertical blanking interval under the control of a microprocessor 52. Data formats for VBI data are well known in the industry and exemplified by the report entitled "Recommended Practice for Line 21 Data Services Part 7 Extended Data Service Packets" draft EIA-608.

VBI encoder/decoder systems are well known in the art and are presently employed for closed captioning for the hearing impaired. Formatting of specific data types for recognition by the microprocessor allows the data storage capability of the VBI to be employed for multiple uses. Various data provided in the vertical blanking interval may include program information for television programs being watched or taped. Commercial information, such as that previously described is also provided in the VBI data. The VBI decoder incorporates a multiplexer under the control of the microprocessor a logic means which segregates program information data from data applicable to the portable data coupon.

In a first embodiment of the present system the coupon data stripped from the VBI by the VBI decoder is provided directly to a retransmitter in the controller. As previously described, this retransmitter may take the form of an IR emitter or a standard serial port employing a hard wired connector.

In a second embodiment of the system the coupon data is directed from the VBI decoder to a memory 54 internal to the controller for storage. This storage allows delayed retransmission to the portable data coupon and under the control of the microprocessor allows burst transmission of stored data in the memory as opposed to real-time intermittent transmission provided by direct VBI decoding. The memory capability of the controller is far less constrained by physical dimensional requirements than the memory of the portable data coupon. Consequently, operational scenarios for the system wherein data stripped from the VBI is temporary stored in the controller and only downloaded to the portable data coupon for use are envisioned.

The data extracted from the VBI by the decoder includes program information or other data which may not be directly applicable to the portable data coupon. Incorporation of the controller system in a VCR, as identified in the exemplary referenced embodiment of patent application Ser. No. 014, 541 is enhanced by providing capability in the controller for directing VBI data and other control information to devices in addition to the portable data coupon. As shown in FIG. 3 the microprocessor provides direct coded control data, for instance, control information for a cable television decoder box, through a code data generator 56. A data formatter 58 under control of the microprocessor provides transmission data to the infrared emitter in specific formats for data categories. For example, as shown in FIG. 3 category 1 data is control data output from the code data system for control of a secondary apparatus by the microprocessor of the controller. Category 2 information is program ID information provided from the controller memory while category 3 data is commercial data available for the portable data coupon. The controller incorporates a clock 60 for time keeping functions providing an output through the data formatter under the control of the microprocessor as category 4 data. The clock 60 of the controller is reset using station time data responsive to a control signal from the microprocessor 52.

In certain applications the controller may be operable from a remote control device as exemplified by a standard VCR remote controller. The IR detector 34 in the controller is adapted to receive IR transmissions from such remote controllers for processing by the microprocessor. The microprocessor in turn converts such remote control inputs to code data for control of alternate devices such as the cable box, television or the portable data coupon. Prompting of the portable data coupon user through the beeper on the coupon during a broadcast of commercial information, as previously described, may be responded to by use of the remote control wherein a predetermined key-stroke on the remote control provides an infrared signal to the controller which is received on the IR detector and provided by the controller microprocessor as a code data signal through the IR emitter of the controller which is in turn received by the IR detector of the portable data coupon to accomplish the save function without the user having to retrieve the coupon and press the save button on the coupon itself. As previously described, the microprocessor 35 in the portable data coupon incorporates data segregation capability based on the data formats, consequently control data in the code data format having a functional representation for the controls of the portable data coupon may be received for "hands-off" operation of the portable data coupon functions.

Use of a remote control for remote activation of control functions for multiple portable data coupons is accomplished by including a card identification number in the key stroke sequence thereby allowing different "electronic coupons" or other data to be saved in separate portable data coupons.

In an additional alternate operational mode for the portable data coupon, program information data stored in the controller memory for use with other controller functions such as, video tape recording, may be downloaded into the portable data coupon for transportation to a second controller. Downloading of the program information would be accomplished under the control of the controller microprocessor through the IR emitter or serial port connection in a data format recognized by the portable data coupon. Data received by the portable data coupon would be stored in temporary or protected storage buffers. Uploading of the data from the portable data coupon to the second controller system would then be accomplished by employing the send key 30 of FIG. 1a on the portable data coupon for transmission of the data through the IR emitter 32 or serial port connector 20 to the memory of the second controller.

An alternate embodiment of the portable data coupon for use without retransmission capability from the controller employs a standard alpha-numeric keypad 62 as represented in FIG. 1c. VBI data decoded from commercial information incorporates a predetermined numerical code which is provided by the controller to the user on the television screen for direct entry into the portable data coupon using the keypad. For example, an encoded version of a standard UPC code may be displayed on the screen which is entered by the user on the keypad and decoded by the microprocessor in the portable data coupon resulting in a display of the vendor/ dealer, product discount amount and expiration data. This data would then be available in protected storage of the portable data coupon for later use as previously described.

Figure 4:
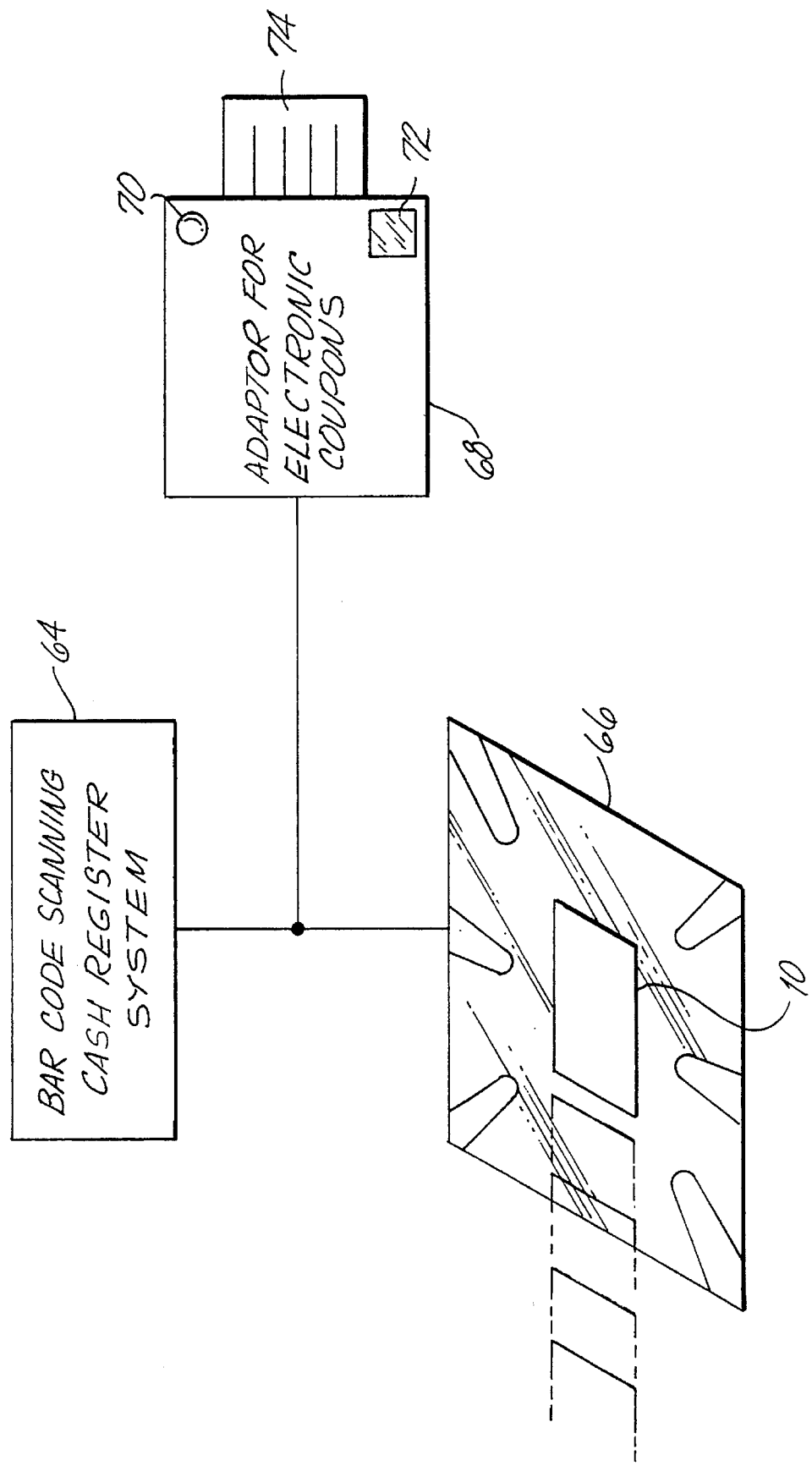
FIG. 4 is a schematic block diagram for a redemption system for electronic coupons provided as stored data for the portable data coupon.

A redemption system for the implementation of the portable data coupon for "electronic coupons" is shown schematically in FIG. 4. A standard bar code scanning cash register system 64 having a scanner 66 is typically employed as a point of sale system. Products sold are scanned by the laser scanner using UPC bar codes and automatically registered in the cash register system with product identification and price. Presently available paper coupons typically employ a UPC bar code which is scanned by the laser scanner, compared to the purchases made, and if the product has been purchased, the coupon discount is applied to the sales total. The portable data coupon may be employed in the same fashion by calling up the recorded discount in a UPC bar code format as previously described and shown in FIG. 1B. Scanning by the normal laser scanner then allows the cash register system to confirm purchase of the discounted product and application of the appropriate discount to the sales total.

Paper coupons are typically collected upon redemption to avoid reuse. Store employees manually cancel each coupon after redemption using the cancel key on the portable data coupon. Alternatively, the portable data coupon, through use of the IR detector 16, automatically deletes a scanned coupon by detection of the laser light signal in the IR detector. To avoid deletion of the "electronic coupon" prior to confirmation that the coupon has been accepted by the cash register system, an identification bit may be set in the storage location, resulting in a time delayed erasure of the coupon which is reversible, if the coupon has not in fact been redeemed, by a coded input by store employees on the controls of the portable data coupon.

A supplemental adapter for electronic coupons 68 for use with the portable data coupon provides a positive interactive communication means with a portable data coupon for enhanced reliability of the point of sale system. The portable data coupon is placed in close proximity to the adapter for infrared signal transmission and reception, allowing a dialog interchange between the adapter and portable data coupon for evaluation and redemption of all "electronic coupons" corresponding to products purchased. The adapter incorporates an infrared emitter 70 and an infrared detector 72 for communication with the portable data coupon. The adapter queries the portable data coupon by data transmission through the IR emitter 70 which is received by the IR detector 16 on the portable data coupon. Data transmitted by the portable data coupon on IR emitter 32 is received by IR detector 72 in the adapter for processing by the cash register system. Upon confirmation of the purchase of the discounted article, a cancellation signal is issued by the adapter on the IR emitter 70, confirming redemption of the coupon. The redemption signal is received by the IR detector 16 on the portable data coupon and data corresponding to the discount is cancelled or erased from storage. A mating connector moiety 74 is also provided in the adapter for connection to the connector moiety 20 on the portable data coupon for communication through the serial interface employing query and response for "electronic coupons" present in the portable data coupon corresponding to products purchased.

Interrogation of the portable data coupon for serial number from the ROM as previously described is employed as a security measure to avoid "pirate" portable data coupons thereby reducing "coupon fraud."

Figure 5:
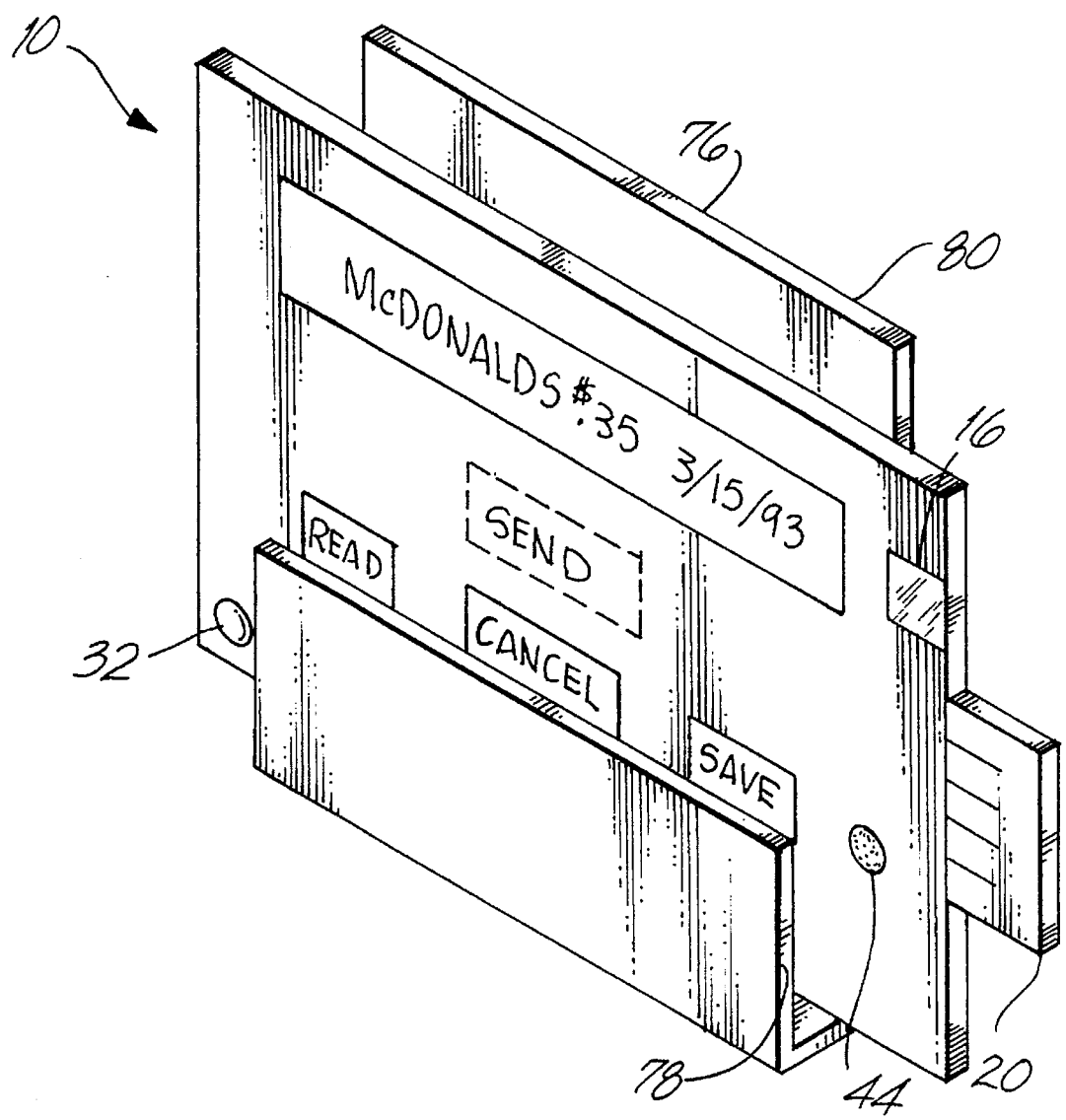
FIG. 5 is a pictorial view of the portable data coupon stored in a holder for receiving transmitted data.

Returning to the system embodiment of FIG 1a, to promote optimum communications with the portable data coupon during remote data transfer from the controller through broad band infrared transmission, placement of the portable data coupon in reasonable proximity to the controller is required. As shown in FIG. 5, a stand 76 comprising a channel having upstanding legs to support the portable data coupon in an substantially vertical orientation is employed. The embodiment shown in the drawings provides a front leg 78 of the channel having a vertical dimension sized to allow exposure of the IR detector 16 and a second leg 80 having a vertical dimension sufficient to support the portable data coupon in a substantially upright position. Use of IR transparent materials for alternate embodiments of the stand eliminates the requirement for a reduced vertical dimension of the first leg. A holder for multiple portable data coupons employing a stepped arrangement between compartments for individual coupons may be employed to provide optimum exposure of the IR detector of each portable data coupon for data reception.

Figure 6:
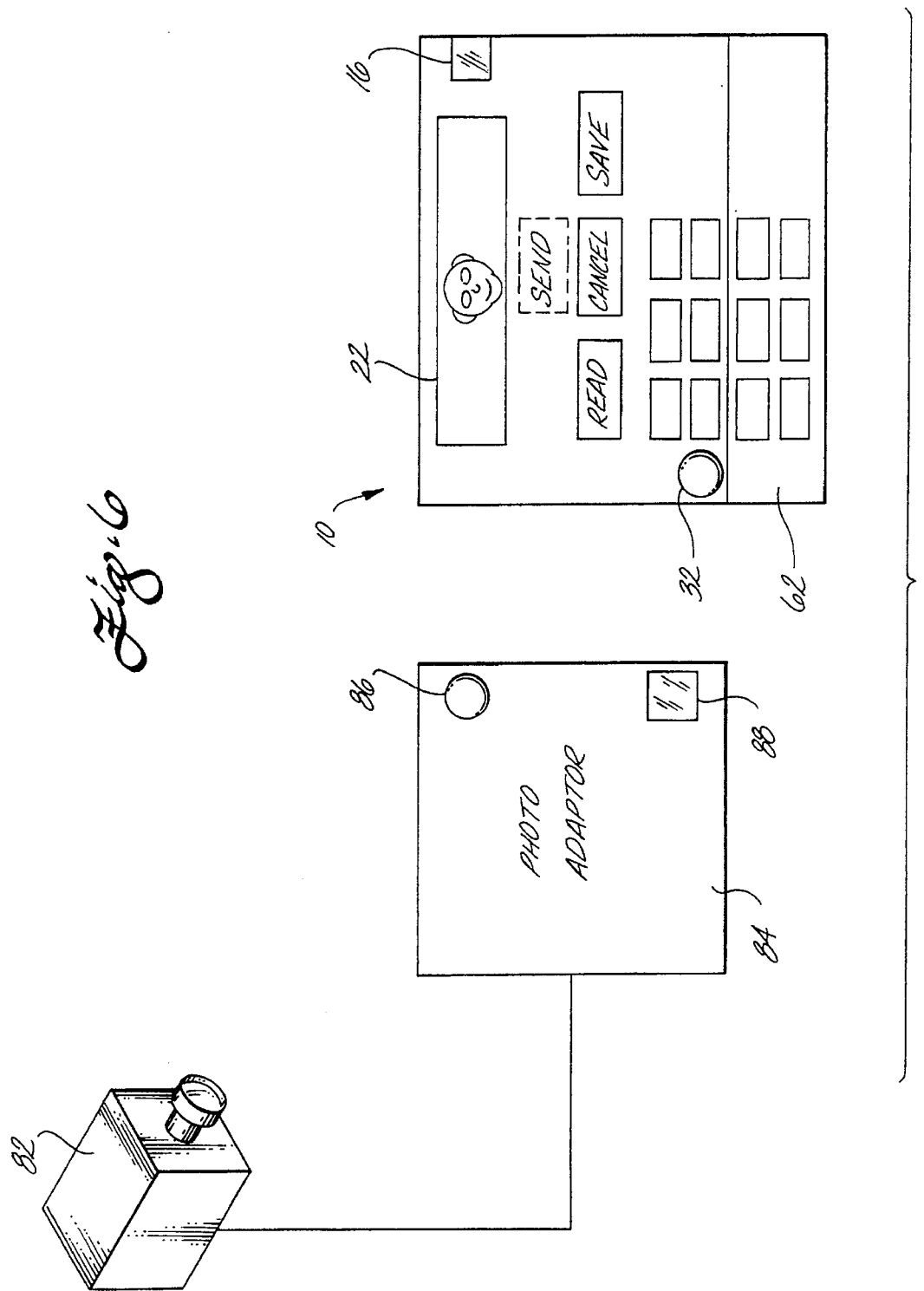
FIG. 6 is a block diagram schematic of an embodiment of the portable data coupon for storage of a picture image allowing use as an electronic ID card.

Yet another embodiment for use of the portable data coupon is shown in FIG. 6. Photographic images taken by a video camera 82 are transmitted through a photo adapter 84 employing an infrared emitter 86 to be received by the portable data coupon on infrared detector 16. Use of the portable data coupon as an electronic identification card is accomplished by requiring entry of a personal identification number (PIN) known to the card owner and corresponding to the serial number of the card stored in the ROM. Video data received from the photo adapter is placed in permanent storage upon proper entry of the PIN. Data transfer and interface control for the video data is accomplished through the use of an IR detector 88 responsive to the IR emitter 32 of the portable data coupon.

In operation, the system allows the user to select poses and replace the stored video information as desired. However, the requirement for entry of the PIN, prior to protected storage of the image precludes improper entry of identification photos. Alternatively, the key board for entry of the PIN is incorporated in the photo adapter and PIN information is verified by dialog communications with the portable data coupon.

Data communication between the photo adapter and portable data coupon is accomplished in an alternative embodiment through the use of the connector and serial port interface as previously described.

Having now described the invention in detail as required by the patent statutes, those skilled in the art will recognize modifications and substitutions to the embodiments disclosed herein. Such modifications and substitutions are encompassed within the present invention as defined in the following claims.

What is claimed is:

1. A portable data coupon comprising:

means for receiving encoded data;

means for storing the received data;

a timekeeping means;

said means for storing also stores current time and date from the timekeeping means with the received data;

means for selectively decoding and displaying the data present in the storing means; and means for selectively transmitting the encoded data to a receiving apparatus.

2. A portable data coupon as defined in claim 1 wherein the encoded data includes current time and date information and further comprising means for updating said time keeping means to current time and date responsive to the encoded data.

3. A portable data coupon as defined in claim 1 wherein the encoded data comprises merchandise or service discount information.

4. A portable data coupon as defined in claim 3 wherein said discount information includes offerer identification and discount identification.

5. A portable data coupon as defined in claim 3 wherein said discount information includes an expiration date.

6. A portable data coupon as defined in claim 5 further comprising means for comparing the current date from the time keeping means to the date included in said discount information and means for deleting said data from the storing means when the expiration date exceeds the current date.

7. A portable data coupon as defined in claim 6 further comprising indicating means responsive to the comparing means for indicating to a user when the current date reaches a predetermined period prior to the expiration date.

8. A portable data coupon as defined in claim 3 wherein the encoded data includes identification of offerer, product or service, and discount amount in UPC format.

9. A portable data coupon as defined in claim 8 wherein the decoding and display means selectively decodes and displays said encoded data in a first alpha numeric format and in a second bar code format and said portable data coupon further includes means for selection of display format.

10. A portable data coupon comprising:

means for receiving encoded data;

means for storing the received data said storing means including;

a plurality of temporary storage locations and means for addressing said temporary storage locations, said addressing means sequentially addressing each temporary storage location for storage of received encoded data, and, when all temporary storage locations are full, addressing the temporary storage location having the oldest data for storage of newly received data;

a plurality of protected storage locations, and means for selectively transferring data from one of said temporary storage locations to one of said protected locations;

means for selectively decoding and displaying the data present in the storing means; and means for selectively transmitting the encoded data to a receiving apparatus.

11. A portable data coupon as defined in claim 10 wherein the means for receiving encoded data comprises an infrared detector.

12. A portable data coupon as defined in claim 10 wherein the means for receiving encoded data comprises a serial input port.

13. A portable data coupon as defined in claim 10 wherein the means for receiving encoded data comprises an alpha numeric key pad.

14. A portable data coupon as defined in claim 10 wherein the encoded data comprises a prompt signal and the portable data coupon further comprises means for indicating that a prompt has been received.

15. A portable data coupon as defined in claim 14 wherein the indicator means is a beeper.

16. A portable data coupon as defined in claim 14 wherein the indicator means comprises a flashing visual indicator.

17. A vertical blanking interval data application system comprising:

a controller connected to receive television signal transmissions including encoded data inserted in the vertical blanking interval of the television signal, said controller having:

a memory for storage of the encoded data received;

means for transmitting the encoded data stored in the memory and, a portable data coupon having:

means for receiving the data transmitted by the controller;

means for storing the received data;

means for selectively decoding and displaying the data present in the storing means, and means for selectively transmitting the encoded data to a receiving apparatus; and wherein said controller further comprises means for detecting data transmitted by said coupon, said detection means connected to the memory for storage of the received coupon data.

18. A vertical blanking interval data application system comprising:

a controller connected to receive television transmission signals and having a VBI decoder for extracting encoded data from the vertical blanking interval of the television transmission signal and means for retransmitting said encoded data, a memory connected to receive encoded data from the VBI decoder and a multiplexer in the VBI decoder connected to the data retransmission means and connected to the memory for selectively providing encoded data from the VBI decoder in a first state to the data retransmission means and to the memory in a second state; and, a portable data coupon having means for receiving the retransmitted encoded data, means for storing received data, means for selectively decoding and displaying the data present in the storing means, and means for selectively transmitting the encoded data to a receiving apparatus.

19. A vertical blanking interval data application system as defined in claim 18 wherein the controller further includes a means for detecting encoded data transmitted by the means for selectively transmitting, said detection means connected to the memory for storing data from the coupon.

20. A vertical blanking interval data application system as defined in claim 18 wherein said controller further comprises:

logic means for segregating categories of data; and a data formatter connected to the retransmission means and responsive to the logic means for formatting data for retransmission corresponding to one of said categories of data.

21. A vertical blanking interval data application system as defined in claim 20 wherein the multiplexer of the VBI decoder directs data to the memory or to the retransmission means in response to the logic means based on the category of the data.

22. A vertical blanking interval data application system as defined in claim 20, further comprising a clock having a time data output and wherein the logic means further segregates the time data as a category of data.

23. A vertical blanking interval data application system as defined in claim 22, wherein station time data is a category of data received by the VBI decoder and further comprising means for resetting the clock to equal the station time data responsive to a control signal from the logic means.

24. A vertical blanking interval data application system as defined in claim 20, wherein the portable data coupon further comprises means for detecting data formatted by the data formatter, said detecting means connected to the receiving means and selectively providing an enable signal to the storing means to allow storing of received data.

25. A vertical blanking interval data application system as defined in claim 20, wherein the controller further comprises means for generating control data for operation of a secondary device, said control data segregated by the logic means as a category of data and wherein said data formatter formats said control data for transmission to the secondary device.

26. A vertical blanking interval data application system as defined in claim 18 wherein the portable data coupon further comprises means for confirming a unique identification of the data coupon to the receiving apparatus.

27. A vertical blanking interval data application system as defined in claim 18 wherein the portable data coupon further comprises means for selectively deleting stored data.

28. A vertical blanking interval data application system as defined in claim 18 wherein the means for storing in the portable data coupon includes at least one temporary storage location and a plurality of protected storage locations, said received data being stored in said at least one temporary storage location and further comprising means for selectively transferring data from said at least one temporary storage location to one of said protected locations.

29. A vertical blanking interval data application system as defined in claim 28 wherein the portable data coupon further comprises a plurality of temporary storage locations and means for addressing said temporary storage locations, said addressing means sequentially addressing each temporary storage location for storage of received encoded data and, when all temporary storage locations are full, addressing the temporary storage location having the oldest data for storage of newly received data.

30. A vertical blanking interval data application system as defined in claim 18 wherein the portable data coupon further comprises a time keeping means.

31. A vertical blanking interval data application system as defined in claim 30 wherein the portable data coupon further comprises means for storing current time and date from the time keeping means with received data.

32. A vertical blanking interval data application system as defined in claim 30 wherein the encoded data includes current time and date information and wherein the portable data coupon further comprises means for updating said time keeping means to current time and date responsive to the encoded data.

33. A vertical blanking interval data application system as defined in claim 18 wherein the encoded data comprises merchandise or service discount information.

34. A vertical blanking interval data application system as defined in claim 33 wherein said discount information includes offeror identification and discount identification.

35. A vertical blanking interval data application system as defined in claim 33 wherein said discount information includes an expiration date.

36. A vertical blanking interval data application system as defined in claim 35 wherein the portable data coupon further comprises a time keeping means for providing current date and time, means for comparing the current date from the time keeping means to the expiration date included in said discount information and means for deleting said data from the storing means when the expiration date exceeds the current date.

37. A vertical blanking interval data application system as defined in claim 33 wherein the encoded data includes identification of offeror product or service and discount amount in UPC format.

38. A vertical blanking interval data application system as defined in claim 18 wherein the decoding and display means of the portable data coupon selectively decodes and displays said encoded data in a first alphanumeric format and in a second bar code format and said portable data coupon further includes means for selection of display format.

39. A vertical blanking interval data application system as defined in claim 18 wherein the retransmitting means comprises an infrared emitter and wherein the means for receiving the retransmitted encoded data comprises an infrared detector.

40. A vertical blanking interval data application system as defined in claim 18 wherein the means for retransmitting comprises a serial output port and wherein the means for receiving the retransmitted encoded data comprises a serial input port.

41. A vertical blanking interval data application system as defined in claim 25 wherein the means for retransmitting said encoded data comprises means for displaying said encoded data and wherein the means for receiving the retransmitted encoded data comprises an alphanumeric keypad.

42. A method for data retrieval and use comprising the steps of:
  encoding data in a predetermined transmission format;
  broadcasting the encoded data as a .portion of a television transmission signal during the vertical blanking interval portion of the signal;
  receiving the television signal with a VBI decoder and extracting the encoded data from the vertical blanking interval;
  intermediately storing the encoded data in a memory prior to retransmission;
  retransmitting the encoded data;
  receiving the retransmitted encoded data in a portable data coupon;
  storing the received data in the portable data coupon;
  selectively decoding and displaying the data present in the portable data coupon; and
  selectively transmitting the encoded data from the portable data coupon to a receiving apparatus.

43. A method for data retrieval and use comprising the steps of:
  encoding data in predetermined transmission format;
  broadcasting the encoded data as a portion of a television transmission signal during the vertical blanking interval portion of the signal;
  receiving the television signal with a VBI decoder, extracting the encoded data from the vertical blanking interval and identifying the encoded data according to predetermined categories;
  formatting the encoded data for retransmission corresponding to the category of the data and retransmitting the encoded data;
  receiving the retransmitted encoded data in a portable data coupon;
  storing the received data in the portable data coupon;
  selectively decoding and displaying the data present in the portable data coupon;
  selectively transmitting the encoded data from the portable data coupon to a receiving apparatus.

44. A method for data retrieval and use as defined in claim 43 wherein receiving the retransmitted encoded data in the portable data coupon includes the step of identifying the data category and wherein storing the received data in the portable data coupon includes the steps of segregating data for storage based on the categories identified and storing said segregated data.

45. A method for data retrieval and use comprising the steps of:
  encoding data in a predetermined transmission format;
  broadcasting the encoded data as a portion of a television transmission signal during the vertical blanking interval portion of the signal;
  receiving the television with a VBI decoder and extracting the encoded signal from the vertical blanking interval;
  retransmitting the encoded data;
  receiving the retransmitted encoded data in a portable data coupon;
  storing the encoded data in a temporary storage location in the portable data coupon;
  selecting encoded data from temporary storage for protected storage;
  selectively decoding and displaying the data present in the portable data coupon; and
  selectively transmitting the encoded data from the portable data coupon to a receiving apparatus.

46. A method for data retrieval and use as defined in claim 45 wherein the step of storing the encoded data in temporary storage further includes the steps of:
  determining when all temporary storage locations are full;
  determining which temporary storage location contains the oldest data; and
  storing newly received data in the storage location having the oldest data.

47. A method for data retrieval and use comprising the steps of:
  encoding data in a predetermined transmission format;
  broadcasting the encoded data as a portion of a television transmission signal during the vertical blanking interval portion of the signal;
  receiving the television signal with a VBI decoder and extracting the encoded data from the vertical blanking interval;

retransmitting the encoded data;

receiving the retransmitted encoded data in a portable data coupon;

storing the received data in the portable data coupon;

selectively decoding and displaying the data present in the portable data coupon; and selectively transmitting the encoded data from the portable data coupon to a receiving apparatus including transmitting a unique identification of the portable data coupon to the receiving apparatus.

48. A method for data retrieval and use comprising the steps of:

encoding data in a predetermined transmission format;

broadcasting the encoded data as a portion of a television transmission signal during the vertical blanking interval portion of the signal;

receiving the television signal with a VBI decoder and extracting the encoded data from the vertical blanking interval;

retransmitting the encoded data;

receiving the retransmitted encoded data in portable data coupon;

storing the received data in the portable data coupon;

selectively decoding and displaying the data present in the portable data coupon; and querying the portable data coupon to determine if encoded data corresponding to a desired data is present in a storage location; and transmitting the data from the storage location of the portable data coupon.

49. A method for data retrieval and use as defined in claim 48 wherein the steps of querying and retrieving are repeated for all desired data.

50. A method for data retrieval and use as defined in claim 48 further comprising the step of deleting the data which has been transmitted from the storage.

* * * * *

UNITED STATES PATENT AND TRADEMARK OFFICE
CERTIFICATE OF CORRECTION

PATENT NO. : 5,523,794
DATED : June 4, 1996
INVENTOR(S) : Roy J. Mankovitz; Henry C. Yuen It is certified that error appears in the above-indentified patent and that said Letters Patent is hereby corrected as shown below:

Column 3, line 20, change "communications" to -- communication --.
Column 3, line 26, before "alphanumeric" change "a" to -- an --.
Column 3, line 35, after "coupon;" delete "and".
Column 3, line 37, change "data." to -- data; and --.

Column 7, line 3, before "stored" change "temporary" to -- temporarily --.

Column 8, line 12, change "alpha-numeric" to -- alphanumeric --.

Column 9, line 15, before "serial" insert -- a --.
Column 9, line 26, before "substantially" change "an" to -- a --.

Column 10, line 43, change "alpha numeric" to -- alphanumeric --.

UNITED STATES PATENT AND TRADEMARK OFFICE
CERTIFICATE OF CORRECTION

PATENT NO. : 5,523,794
DATED : June 4, 1996
INVENTOR(S) : Roy J. Mankovitz; Henry C. Yuen It is certified that error appears in the above-indentified patent and that said Letters Patent is hereby corrected as shown below:

Column 11, lines 8,9, change "alpha numeric" to -- alphanumeric --.

Column 13, line 42, change "claim 25" to -- claim 18 --.

Signed and Sealed this

Eleventh Day of March, 1997

*Attest:*

BRUCE LEHMAN

*Attesting Officer*   Commissioner of Patents and Trademarks

UNITED STATES PATENT AND TRADEMARK OFFICE
CERTIFICATE OF CORRECTION

PATENT NO. : 5,523,794
DATED : June 4, 1996
INVENTOR(S) : Roy J. Mankovitz, et. al.

It is certified that error appears in the above-indentified patent and that said Letters Patent is hereby corrected as shown below:

On the Title Page, insert the Assignee as follows:
-- [73] Assignee: Index Systems, Inc., Road Town, Tortola, British Virgin Islands --.

Signed and Sealed this

Sixth Day of May, 1997

Attest:

BRUCE LEHMAN

*Attesting Officer*      *Commissioner of Patents and Trademarks*